Figure 1:
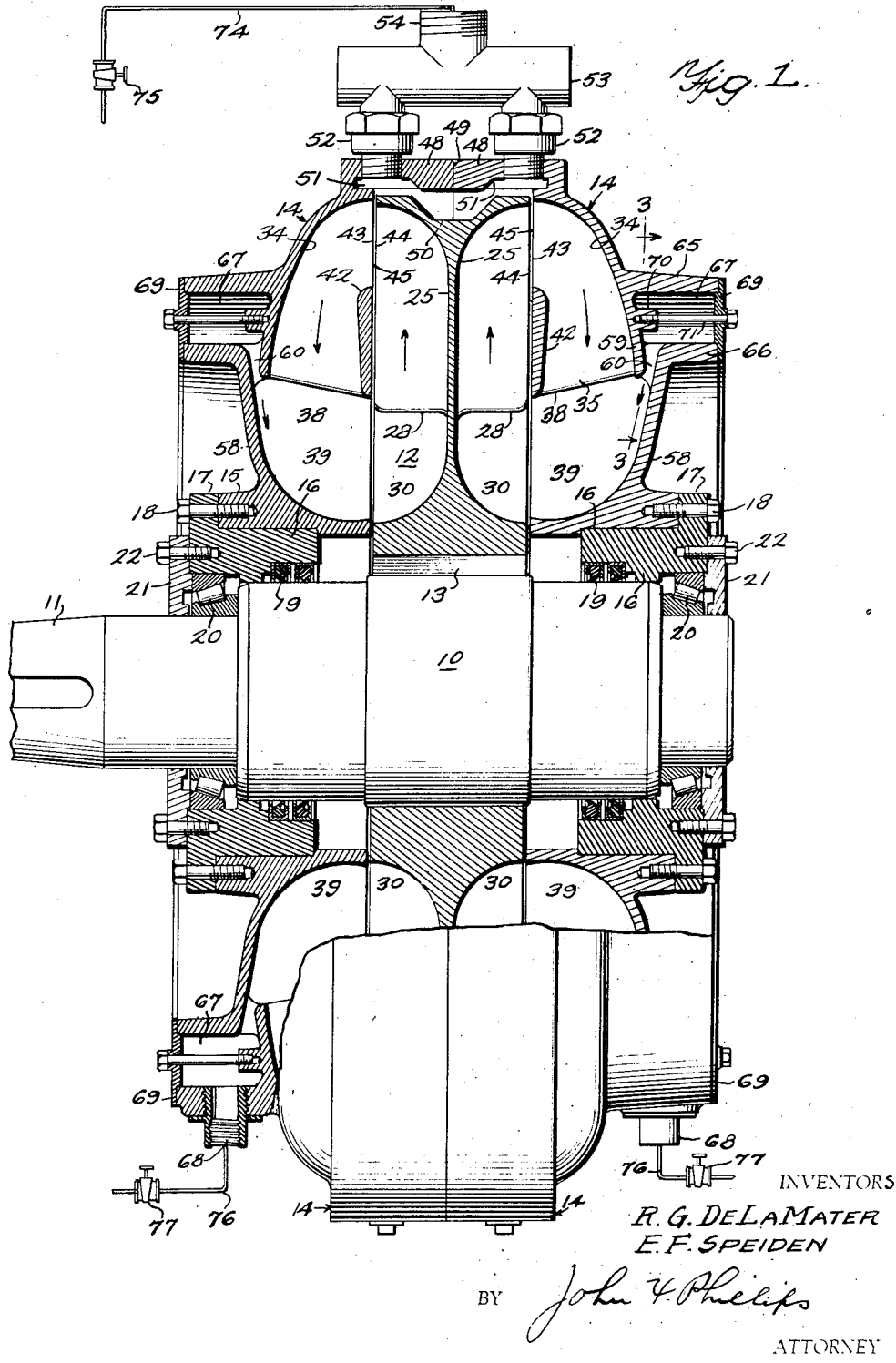

March 26, 1957  R. G. DE LA MATER ET AL  2,786,552
HYDRODYNAMIC BRAKES
Filed March 20, 1952  3 Sheets-Sheet 1

INVENTORS
R. G. DeLaMater
E. F. Speiden
BY John Y. Phelips
ATTORNEY

March 26, 1957 R. G. DE LA MATER ET AL 2,786,552
HYDRODYNAMIC BRAKES
Filed March 20, 1952 3 Sheets-Sheet 2
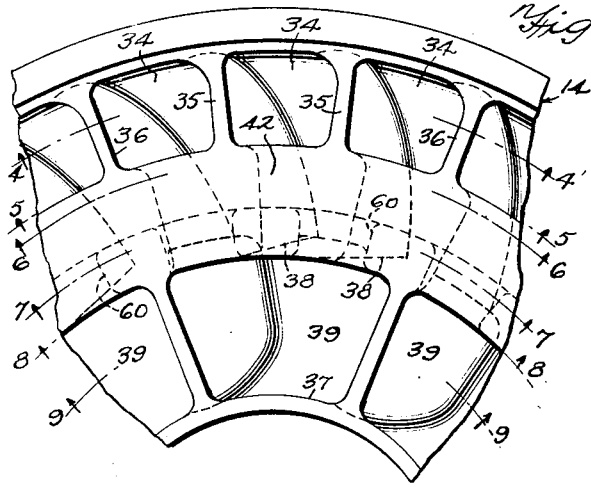
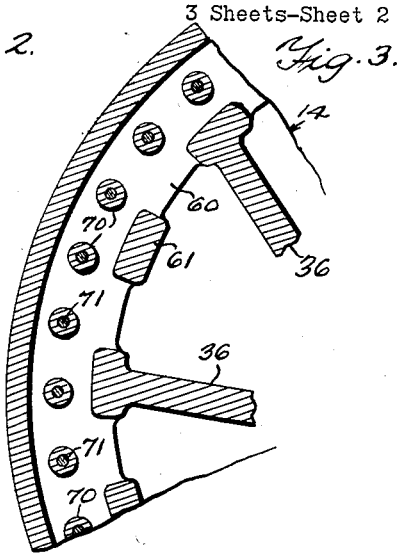
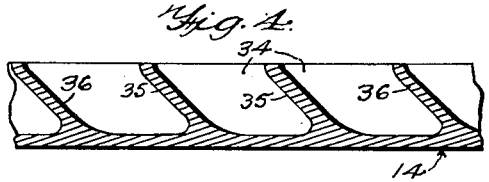
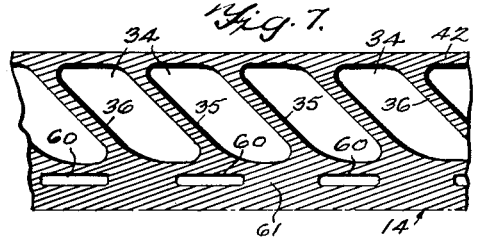
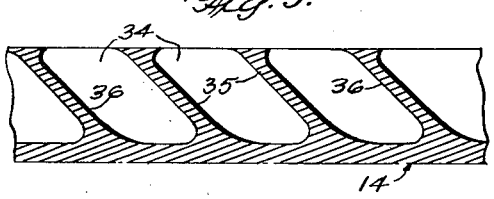
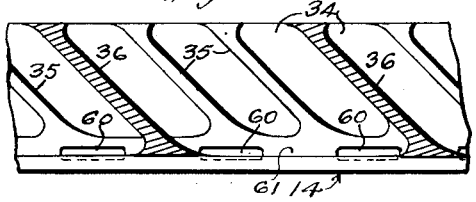
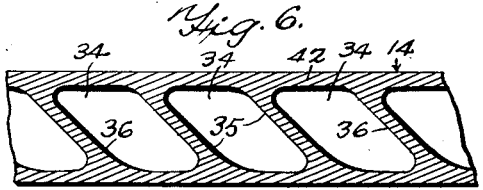
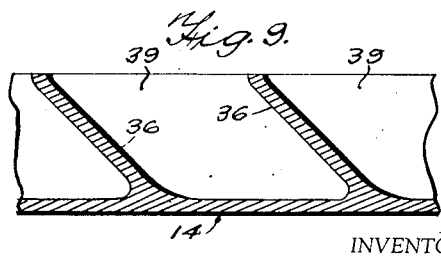
INVENTORS
R. G. DE LA MATER
E. F. SPEIDEN
BY John Y. Phillips
ATTORNEY March 26, 1957　　R. G. DE LA MATER ET AL　　2,786,552
HYDRODYNAMIC BRAKES Filed March 20, 1952　　3 Sheets-Sheet 3

INVENTORS
R. G. DE LA MATER
E. F. SPEIDEN
BY John V. Phillips
ATTORNEY

United States Patent Office 2,786,552
Patented Mar. 26, 1957

2,786,552

HYDRODYNAMIC BRAKES

Robert Griffin De La Mater and Edgar F. Speiden, Parkersburg, W. Va., assignors to The Parkersburg Rig & Reel Company, Parkersburg, W. Va., a corporation of West Virginia Application March 20, 1952, Serial No. 277,656

11 Claims. (Cl. 188—90)

This invention relates to hydrodynamic brakes.

Numerous types of hydrodynamic brakes have been developed for various purposes in which this type of brake has been found particularly satisfactory for limiting rotational speeds independently of or in conjunction with frictionally engaging surfaces. In brakes of this type, water commonly has been used as the fluid medium, and due to the generation of heat incident to the operation of such a brake, it is necessary to maintain a flow of water through the brake. This has been done in two general ways, namely, by positively pumping water into the brake, and by so designing the brake as to utilize the pumping characteristics thereof for effecting a flow of water therethrough. In the latter type of brakes, it has been proposed to provide drilled openings through the stator members for the flow of water into the rotor pockets, and the inlet tubes have been so arranged as to take advantage of the circulation of water in the brake to induce a flow of water thereinto.

Brakes of the type just referred to have been found highly practicable in commercial use, notably in oil field practice. However, the provision of water inlet tubes which are inclined both radially and circumferentially for the introduction of water into the brake possesses certain disadvantages which prevent taking full advantage of the efficiency of a brake of this type. For example, the inlet tubes extending through the pockets of the stator obstruct the flow of water through the stator pockets, thus reducing the effective cross sectional areas of the pockets and interrupting the flow of water and causing turbulence therein.

A further disadvantage of such brakes lies in the fact that the water is introduced directly into the rotor pockets, and because of the successive passage of rotor vanes past the inlet openings of the tubes, the water flows into the rotor pockets in a pulsating action. In brakes of this type, the escaping of water leaving the brake flows through the clearance space between the rotor and stator adjacent the periphery thereof. As a result of the introduction of water directly into the rotor pockets, some of the fresh cool water is discharged before it can be thoroughly mixed with the hot water or passed through a complete cycle of operation. When the brake is operating at maximum capacity, the rotor pockets must be full or practically full of water, and it necessarily follows that a smaller volume of fresh cool water can be introduced under such conditions than when the pockets are only partly filled.

An important object of the present invention is to provide an improved means for introducing water into a hydrodynamic brake whereby the latter provides cooler and more uniform operation under all loads and speed conditions.

A further object is to provide a brake which accomplishes the results referred to by increasing the rate of influx of fresh cool water and wherein the points of introduction of the water are such as to provide for a more thorough mixing of the fresh water with the recirculated water and causing the fresh water to make substantially at least one complete cycle of movement through the rotor and stator before any of it can be discharged, thus insuring the maintenance of lower operating temperatures.

A further object is to provide such a brake having an improved means for introducing fresh water, mixing it with the recirculated water, and increasing the percentage of fresh water in the mixture, thus assuring more uniform brake resistance under high speed-low capacity operation than has been possible with prior constructions.

A further object is to provide a hydrodynamic brake of the character referred to wherein, when the brake is operating at maximum capacity and substantially full of water, a higher rate of introduction and a higher percentage of fresh cool water in the mixture insures continuous operation without excessive temperatures and at a higher capacity range than has been previously possible.

A further object is to provide novel means for utilizing the inherent characteristics of a hydrodynamic brake for introducing water thereinto without obstructing the stator pockets and without thereby reducing the capacity of such pockets or causing eddy currents, thus increasing the maximum brake capacity for any given speed.

A further object is to provide such a brake wherein the water flows into the brake in steady streams instead of a pulsating influx, thus providing more uniform constant resistance.

A further object is to provide novel means for supplying water to a hydrodynamic brake wherein the induced flow is at a higher and more uniform rate as a result of which the head or pressure of the fresh water supply need only be great enough to assure the delivery of an adequate volume to the water inlet manifold of the brake.

Other objects and advantages of the invention will become apparent during the course of the following description.

Figure 10:
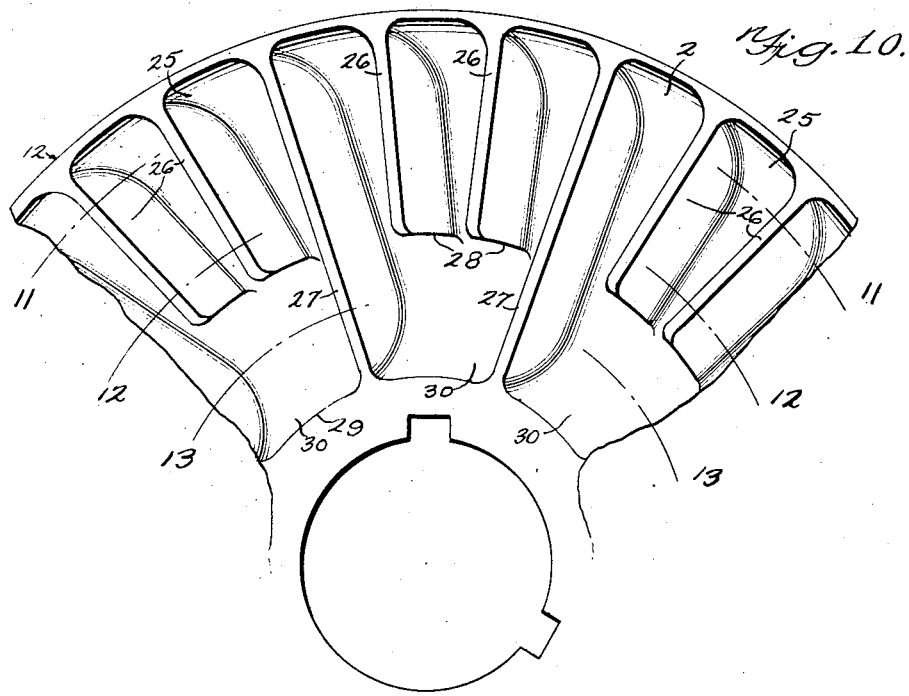
Figure 11:
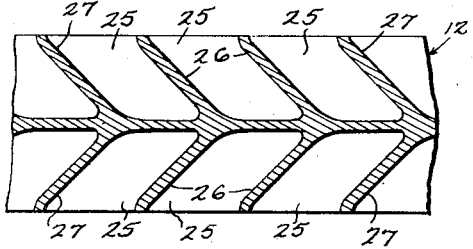
Figure 12:
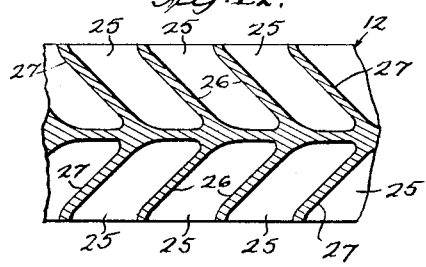
Figure 13:
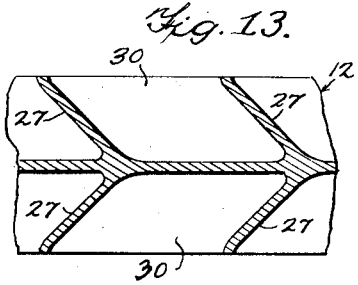

In the drawings, we have shown one embodiment of the invention. In this showing, Figure 1 is a diametrical sectional view through the brake, parts being shown in elevation and parts being broken away, Figure 2 is a slightly enlarged fragmentary face view of a portion of one of the stator members, Figure 3 is a fragmentary sectional view taken substantially on the line 3—3 of Figure 1, Figure 4 is a fragmentary sectional view on line 4—4 of Figure 2, Figure 5 is a similar view on line 5—5 of Figure 2, Figure 6 is a similar view taken on line 6—6 of Figure 2, Figure 7 is a similar view taken on line 7—7 of Figure 2, Figure 8 is a similar view taken on line 8—8 of Figure 2, Figure 9 is a similar view taken on line 9—9 of Figure 2, Figure 10 is a fragmentary face view of a portion of the rotor, Figure 11 is a fragmentary sectional view on line 11—11 of Figure 10, Figure 12 is a similar view on line 12—12 of Figure 10, and Figure 13 is a similar view on line 13—13 of Figure 10.

Referring to Figure 1, the numeral 10 designates the shaft for the device, one end 11 of which projects from the brake for connection with the rotary unit whose speed of rotation is to be controlled. A rotor indicated as a whole by the numeral 12 is keyed as at 13 to the shaft 10 to be driven thereby. This rotor will be described in detail later. On opposite sides of the rotor are arranged stator members each indicated as a whole by the numeral 14. Suitable means (not shown) are employed for supporting the stator members and fixing them against rotation, such means forming no part of the present invention. The parts of the stator members will be described more in detail later. Each stator member is provided with a projecting integral annular portion 15 surrounding a stationary hub 16 and fixed to an annular flange 17 thereon by bolts 18. Suitable leakproof packing 19 is arranged in the hubs 16 to form a water-tight fit with the shaft 10. The hubs 16 support the shaft 10 for rotation by suitable anti-friction bearings 20, covered and protected by a plate 21 fixed to the associated hub 16 as at 22.

The rotor member 12 (Figures 1 and 10) is provided with pockets 25, certain of which are separated by vanes 26 and certain of which are formed between such vanes and radially longer vanes 27. In this connection, it may be pointed out that in conventional hydrodynamic brakes, the vanes defining the pockets of the rotor and stator extend throughout the radial lengths of the pockets and define segmental pockets which obviously are substantially narrower at their radially inner than at their radially outer ends. This tends appreciably to constrict the flow of water in the radially inner ends of the pockets. In the present instance, the vanes 26 terminate along the lines 28 whereas the vanes 27 extend to the radially inner extremities 29 of the pockets, the termination of the vanes 26 thus forming in effect single pockets 30 between the radially inner portions of the vanes 27. This provides an appreciably greater degree of uniformity in the flow of the water through the brake. The vanes 26 and 27 are inclined in the usual manner as shown in Figures 11, 12 and 13. It will be apparent from such figures that the widths of the pockets 25 decrease radially inwardly as indicated by the narrowing of the pockets in Figure 12 as compared with Figure 11. A relatively wider pocket 30 is illustrated in Figure 13, this section being taken radially inwardly of the extremities 28 of the vanes 26.

The stator members are illustrated in Figures 1 and 2 to 9 inclusive. These stator members may be identical, and accordingly only one need be described in detail. Each stator member is provided with radial pockets 34 formed by sets of vanes 35 and 36, the latter of which extend inwardly to the radially inward extremities 37 of the pockets in the same manner as the vanes 27 of the rotor. The vanes 35 extend inwardly only to the lines 38 (Figures 1 and 2) whereby the pockets 34 between adjacent pairs of vanes 35 and 36 merge into single pockets 39 corresponding to the pockets 30 of the rotor. The radially inward constriction of the stator pockets in a brake of this character obviously interferes with the flow of water through the brake, the flow through the stator pockets being radially inward. By shortening the vanes 35, the radially inward flow of water through three pockets 34 in the present embodiment of the invention merges into a single flow in each individual pocket 39. Thus the present construction provides a greater degree of freedom of flow of the water being circulated in the brake.

Integral with each stator member is a shroud plate or ring 42, the function of which is to prevent the flow of water between the rotor and stator pockets except where such flow is desired. The inner face of each stator member lies in a plane 43 with which the inner face of the shroud ring 42 is coincident. Similarly, the remote faces of the rotor member terminate in planes 44 parallel to the respective planes 43 and slightly spaced therefrom as at 45 for clearance and for the radially outward flow of water for discharge from the brake.

Referring to Figure 1, it will be noted that the stator members are provided at their peripheries with flanges 48 extending toward each other and having machined contacting faces 49, the two stator members being fixed with respect to each other by conventional bolts (not shown). The periphery of the rotor member 12 is preferably provided with an annular groove 50 to remove weight from the rotor. Water flows radially outwardly through clearances 45 and into the circumferential clearance around the rotor, and this water is free to flow into recesses 51 formed within the flanges 48. Outlet water connections 52 are tapped into the flanges 48 for communication with the recesses 51 and the connections 52 lead to an outlet manifold 53 provided with an outlet connection 54 for the discharge of water from the brake.

Novel means is provided for supplying water to the brake. Referring to Figure 1, it will be noted that the back wall portions 58 of the stator pockets radially inwardly of the extremities 38 of the vanes 35 are offset outwardly with respect to the back wall portions of the stator pockets indicated by the numeral 59 and extending radially outwardly of the line 38. Thus the wall portions 59 are stepped inwardly with respect to the wall portions 58, and this provides for water inlet openings 60 (Figures 1, 3, 7 and 8) separated by intervening portions 61 of the stator casting from certain of which the stator vanes 36 extend radially inwardly as shown in Figure 3. The inlet openings 60 are elongated circumferentially of the brake and are relatively narrow transversely of such direction as will be apparent in Figures 7 and 8. Referring to Figure 1, it will be noted that the inner face of each stator back wall portion 58 extends relatively straight and flat to form one wall of each opening 60, and it will become apparent that water fed into the stator pockets 39 will flow substantially parallel to the wall portions 58. In this connection, it will be noted that the water flows into the relatively wide pockets 39 radially inwardly of the line 38 at which the vanes 35 terminate.

Each stator is provided with integral annular projecting flanges 65 and 66 forming therebetween a manifold 67 and into each manifold 67 water flows through a suitable connection 68 connected to a suitable source of water. Each manifold 67 is covered by an annular plate 69, as shown in Figure 1. The outer face of each back wall portion 59 is cast with integral studs 70 (Figures 1 and 3) which are drilled and tapped to receive the threaded inner ends of bolts 71 by which the plates 69 are fixed in position.

For the proper regulation of the brake, means are provided for controlling the rate of influx and efflux of the water. In Figure 1, the outlet 54 is shown diagrammatically as being connected to an outlet pipe 74 in which is arranged a valve 75 to control the rate of discharge flow through the pipe 74. The inlets 68 are connected to the source of water supply through pipes 76 in each of which is a valve 77 to control the rate of flow of water into the brake, these pipes and valves also being diagrammatically shown in Figure 1.

*Operation*

The theory of operation of hydrodynamic brakes is too well-known to require any detailed description. It will be apparent that the water in the brake pockets flows in the directions of the arrows in Figure 1, the water flowing radially outwardly through the rotor pockets due to the centrifugal action of the rotor and forcing the water in the stator pockets to flow radially inwardly. Thus the water from the rotor pockets is discharged at the radially outer portions thereof into the stator pockets radially outwardly of the shroud plates 42, and the water is discharged from the stator pockets 39 into the rotor pockets 30 radially inwardly of the shroud plates 42. Thus the brake performs its operations in accordance with the usual hydrodynamic theory of operation of an apparatus of this character.

It will be obvious that the shroud plate 42 of each stator member predetermines the radially inner limits of the pockets 34 from which the water can flow into the stator pockets. Similarly, the plates 42 predetermine the radially outer limits of the flow of water from the pockets 39 into the associated pockets 30 of the rotor, it being impossible for the water to take any short-cuts in flowing between the rotor and stator pockets, thus increasing the efficiency of the braking action.

As previously stated, the termination of certain of the rotor and stator vanes at the lines 28 and 38 reduces the constriction normally present to tend to oppose the water flow in the radially inner portions of the rotor and stator pockets. In this connection, it will be noted that as the water flows radially inwardly through stator pockets 34, the constriction opposing the flow of the water tends only slightly to increase because of the termination of the vanes 35 along the lines 38. Radially inwardly of such lines, the flow of water is wholly free and unobstructed, and attention is further invited to the fact that the absence of inlet tubes bridging across the stator pockets 34 eliminates any interference with the flow of water through such pockets and eliminates the eddy currents usually occurring through the use of inlet tubes of such type. It will be apparent that all of the rotor and stator pockets are wholly lacking in any elements which tend to interfere with the radial flow of the liquid. This fact alone tends further to increase the efficiency of operation of the brake.

The water inlet openings 60 are preferably but not necessarily rectangular in section and each preferably has its length as great as the contour of the associated pocket permits. Each opening 60 is preferably as narrow as practicable. In other words, the length of the pockets should be as great as possible and the width as narrow as possible while still permitting ample flow of water into the pockets 39. With the openings 60 made as narrow as practicable, the flow of the water follows along the inner face of the back wall 58 of each stator member and the radially inward flow of water through the stator pockets induces the flow of water through the openings 60 at a relatively rapid rate. Particular attention is invited to the fact that due to the termination of the stator vanes 35 along the lines 38, internal pressures in the radially inwardly flowing water is released in the pockets 39, thus eliminating any pressure which might tend to minimize the flow of water through the openings 60, the velocity of the flow of water thus being advantageously utilized to assist in the flow of water into the pockets 39 of the stator members.

Water is supplied to the manifolds 67 for flow through the openings 60 by means of the connections 68, water being supplied to these connections from any suitable source. The manifolds 67 are annular and the head or pressure of the water in the source need be only sufficiently great to assure the maintenance of maximum volumes of water in the manifolds 67. Water from the source under substantial pressure is unnecessary because of the highly efficient formation of the parts through which the flow of water is induced into the stator pockets.

Particular attention is invited to the fact that the outlet end of each opening 60 may be considered to be generally perpendicular to the inner face of the adjacent back wall 58. When the brake is in operation, the circulated water is delivered from the pockets of the rotor to the pockets of the stator with considerable velocity. The water in the stator pockets travels radially inwardly toward the hub, and as the water passes the throats of the fresh water inlet passages 60, its flow pattern is governed by the stator pocket contour above each inlet opening. Thus it jumps the gap provided by the outward offsetting of the back wall 58 and in so doing creates a venturi action and partial vacuum at the throats of the inlet passages. It also should be noted that the axis of each inlet opening 60 is generally inclined radially inwardly and in the direction of the flow of water in the stator pockets. This results in a relatively rapid, smooth and continuous supply of fresh cool water into the stator pockets and the cool water thus introduced is thoroughly mixed with the warmer recirculated water before it is directed toward and delivered to the radially inner portions of the rotor pockets.

The present apparatus differs from conventional prior constructions in that the water is introduced into the stator pockets instead of the rotor pockets and is not in any way interrupted or adversely affected by the rotation of the rotor as in the case of inlet tubes extending through the stator into proximity to the face of the rotor. Moreover, the present construction does not involve the use of any tubes or pipes projecting beyond any operating faces of the stator pockets to interfere with the free flow of liquid and cause eddy currents. The incoming water is mixed thoroughly with the recirculated water and has no chance to leave the brake until it has made at least approximately three-quarters of a cycle of operation as will be apparent from Figure 1. In other words, water flowing through openings 60 mixes with the water in the stator pockets 39 and then must flow throughout the radial lengths of the associated rotor pockets before reaching the radially outer extremity of the rotor, and only a small portion of the water is discharged through the spaces 45. This provides for a thorough mixture of the incoming cool water with the heated recirculated water, thus tending effectively to minimize the temperature of the water. Of course, the rotation of the rotor generates centrifugal force, thus creating a pumping action tending to cause water in the rotor pockets to flow radially outwardly into the circumferential clearance around the rotor. The ring of water filling the annular clearance around the rotor creates a water seal which closes off direct communication between the outlets 52 and the interior of the brake.

For any given speed of the rotor, the capacity of a hydrodynamic brake varies with the quantity of water being circulated. Maximum resistance requires a maximum volume of water and, to keep the temperatures down to a minimum, requires a maximum rate of replacement of warm water with cool water. With conventional methods of introducing water into the rotor and when operating at maximum capacity, there was some interrelationship between the volume of water delivered to the rotor pockets at the radially inner ends thereof and the volume of fresh water which may be delivered from the inlet tubes. Moreover, the quantity of fresh water that may be introduced generally is dependent to a large extent upon how full the rotor pockets may be. Obviously, for a given speed and low brake resistance, the pockets will be less than full and the effect is to permit a greater inlet flow of fresh water than when operating at maximum resistance with the pockets full of water. With the present construction, at any given speed of operation, and when operating at maximum resistance with a maximum quantity of water in the brake, the velocity of flow of water through the openings 60 into the brake is equal to or greater than when operating with less water and lower resistance. This is due to the fact that with a maximum volume of water in the brake, there is a maximum inducing of the flow of water through the openings 60 due to the shape and arrangement of the parts, including the openings and the stator pocket walls associated therewith. Consequently, the desirable condition is obtained of inducing a higher rate of influx of fresh water when operating at high resistance than when the brake is operating at low resistance and circulating less water. Obviously, it is during high capacity operation that it is important to maintain a maximum flow of cool water into the brake. Particular attention is invited to the fact that the present apparatus requires no auxiliary supply pump or outside source of water under pressure. Since the brake provides a highly efficient method of inducing the flow of water into the brake, and this induction action is dependent upon the speed of rotation of the rotor and the amount of resistance required.

The following is a more detailed explanation of the method of controlling the resistance and the regulation of the rate of water circulation into and out of the brake at any speed of operation thereof. In operation, the circumferential surface of the rotor coacts with the inner circumferential surface of the stator to create a centrifugal pumping action which discharges the water through the clearance spaces 45 and thence out of the casing through outlets 52. Water is fed to each clearance space 45 from the interior of the brake at the same rate the water is discharged from the outlet 54. For any given speed of operation, there is a maximum possible rate of discharge and this rate may be regulated from this maximum to any desired minimum by adjustment of the discharge valve 75.

If for any speed the discharge valve 75 is opened to permit a greater rate of discharge than the rate at which water may be induced to flow into the inlets 68, the volume of water maintained in the brake and circulated through the pockets will be reduced and the resistance of the brake at that speed will be lowered. Conversely, if the discharge rate is reduced below the rate of induction of water into the brake, the volume of water in the brake will be increased and the brake resistance will be increased. It is both possible and practicable to increase or decrease the brake resistance at any speed of operation by adjustment of the discharge valve 75 so as to increase or decrease the volume of water maintained in the brake and circulated through the pockets. It is then possible and practicable to maintain this resistance constant by further adjustment of the discharge valve so that the rate of discharge becomes equal to the rate at which water is induced to flow into the brake under these conditions of operation.

Since for most conditions of speed and resistance, it is generally preferable to circulate the maximum possible volume of water into and out of the brake, it is preferred to set the discharge valve 75 to obtain the maximum possible rate of discharge for these given conditions and then maintain this resistance constant by adjustment of the inlet valves 77 to the required setting. At any speed of operation and desired resistance between maximum and minimum for that speed, a definite volume of water must be maintained within the brake and circulated between the pockets of the rotor and stator. At such speed of operation and for this volume of water passing through the inlet passages 60, there is a definite maximum rate at which fresh water may be induced to flow through the passages 60. This rate may regulated from this maximum to any desired minimum and to exactly equal the rate of discharge through outlet 54 by regulation of the inlet valves 77. For a given condition of speed and required resistance and to permit a flexible range of close resistance control, it is generally preferable to first set the valve 75 so that under these conditions the rate at which water is discharged is slightly less than the maximum rate at which water may be induced to flow into the brake. The procedure is then to adjust the inlet valves 68 until the rate of inflow is exactly equal to the rate of discharge. If it should then be desired to increase the resistance at this speed of operation, the inlet valves 77 are then opened wider which will result in a greater inflow than discharge. When the desired increase in resistance is obtained, the inlet flow through valves 77 is further adjusted until it again equals the rate of discharge.

As previously stated, it has been found to be highly advantageous to terminate some of the vanes of the rotor and stator short of the radially inner limits of the pockets to provide for a freer unrestricted flow of water through the pockets, and this is particularly true of the stator. In this connection, it will be noted in Figure 1 that in addition to terminating certain of the stator vanes at the line 38, the stator pockets are deeper radially inwardly of such line, which assists in providing an unrestricted flow of water radially inwardly through the stator pockets. At the same time, this greater depth of the stator pockets 39 permits the utilization of the openings 60 for the flow of water into the brake.

The use of the shroud rings 42 is particularly advantageous in combination with the other features of the present construction. The extending of the shrouds 42 radially outwardly substantially beyond the radially inner ends of the inlet openings 60 helps materially in smoothing out the flow pattern past the inlet throats of the openings 60 and thus appreciably increases the rate of flow of water into the brake. By extending the shrouds 42 radially inwardly slightly beyond the inlet throats of the openings 60, the shrouds tend to shield the throats of the openings 60 from any turbulence or cross circulation that otherwise might be created between the rotor and stator in that area. This also has a beneficial effect of increasing the inlet flow.

From the foregoing, it will be apparent that the present construction involves substantial advantages in operational efficiency over prior structures of this type. In actual practice, it has been found that the braking capacity of a brake structure of a given size is very materially increased over prior constructions. There is a freer circulation of water in the brake without constriction or obstruction; eddy currents are reduced to a minimum; the rate of water influx and discharge is materially increased without the use of pumps; the brake functions to provide a maximum rate of water influx without pumps when the brake contains a maximum volume of water, and water temperatures are maintained at a minimum for the operation of the brake at any given braking capacity.

We claim:

1. A hydrodynamic brake comprising a rotor and a stator provided with generally radial vanes forming coacting fluid pockets which taper to decrease in width radially inwardly, certain of said vanes of said stator terminating radially outwardly of the radially inner limits of certain other vanes whereby the pockets embraced between such other vanes at the radially inner portions of said stator merge into single pockets, and means for introducing fluid into at least one of said single pockets at a point remote from the adjacent faces of said rotor and said stator and adjacent the radially inner termination of said first-mentioned vanes.

2. A hydrodynamic brake comprising a rotor and a stator provided with generally radial vanes forming coacting fluid pockets which taper to decrease in width radially inwardly, certain of said vanes of said stator terminating radially outwardly of the radially inner limits of certain other vanes whereby the pockets embraced between such other vanes at the radially inner portions of said stator merge into single pockets, at least one of said single pockets having a back wall remote from the adjacent faces of said rotor and said stator offset longitudinally away from such adjacent faces beyond the corresponding back wall portion embraced by said first-mentioned vanes, and said stator being provided with a water inlet opening at such offset point to supply fluid to said one single stator pocket.

3. A hydrodynamic brake constructed in accordance with claim 2 wherein said fluid opening has an effective discharge end lying in a plane substantially perpendicular to said offset wall portion whereby fluid flows directly along said offset wall.

4. A hydrodynamic brake constructed in accordance with claim 2 wherein said offset wall diverges radially outwardly from the adjacent faces of said rotor and said stator, said opening being circumferentially elongated and longitudinally narrow and having an effective discharge orifice perpendicular to said diverging wall portion to feed fluid inwardly thereover.

5. A hydrodynamic brake comprising a rotor and a stator provided with generally radial vanes forming coacting fluid pockets which taper to decrease in width radially inwardly, certain of said vanes of said stator terminating radially outwardly of the radially inner limits of certain other vanes whereby the pockets embraced between such other vanes at the radially inner portions of said stator merge into single pockets, at least one of said single pockets having a back wall remote from the adjacent faces of said rotor and said stator offset longitudinally away from such adjacent faces beyond the corresponding back wall portion embraced by said first-mentioned vanes, and said stator being provided with a water inlet opening at such offset point to supply fluid to said one single stator pocket, and a relatively thin shroud plate fixed to said stator perpendicular to and concentric with the axis thereof, said shroud plate having a radially inner edge substantially coincident with the radially inner terminations of said first-mentioned vanes and lying radially inwardly at least as far as said opening.

6. Apparatus constructed in accordance with claim 5 wherein said opening is circumferentially elongated and longitudinally relatively narrow, one wall of said opening being coincident with said offset wall.

7. A hydrodynamic brake comprising a rotor and a stator provided with radially extending vanes forming coacting pockets, a shroud plate integral with said stator perpendicular to and concentric with the axis thereof and having a longitudinally inner face coincident with the longitudinally inner face of said stator, certain of said vanes terminating along lines radially outwardly of the radially inner limits of the remaining vanes and said lines of termination being substantially coincident with the radially inner edge of said shroud plate, there being single pockets between adjacent pairs of said remaining vanes radially inwardly of said lines of termination, said single pockets having back walls offset longitudinally from the adjacent faces of said rotor and said stator away from the back wall portions of the pockets of said stator radially inwardly of said lines of termination and providing therethrough fluid inlet openings, and an annular manifold carried by said stator and communicating with said openings.

8. A hydrodynamic brake constructed in accordance with claim 7 wherein said back walls of said single pockets diverge radially outwardly from the adjacent faces of said rotor and said stator, said openings being circumferentially elongated and longitudinally narrow to supply over such offset walls relatively flat streams spread substantially over the areas thereof.

9. A hydrodynamic brake comprising a rotor and a stator having adjacent faces perpendicular to the axis of said rotor and provided in such faces with vanes defining pockets, said faces being slightly spaced from each other, means for discharging externally of the brake fluid flowing radially outwardly between said faces, one of said stator pockets having a wall portion remote from said rotor provided with a fluid inlet opening, said wall portion radially inwardly of said opening being offset away from said rotor out of alinement with such wall radially outwardly of said opening whereby decrease in pressure is created at said opening to feed fluid generally radially inwardly into said one stator pocket, the walls of said rotor pockets between said vanes being smooth and imperforate, and means connected for supplying fluid to said fluid inlet opening independently of fluid circulating in the brake.

10. A hydrodynamic brake comprising a rotor and a stator having adjacent faces perpendicular to the axis of said rotor and provided in such faces with vanes defining pockets, said faces being slightly spaced from each other, means for discharging externally of the brake fluid flowing radially outwardly between said faces, one of said stator pockets having a wall portion remote from said rotor provided with a fluid inlet opening, said wall portion radially inwardly of said opening being offset away from said rotor out of alinement with such wall radially outwardly of said opening whereby decrease in pressure is created at said opening to feed fluid generally radially inwardly into said one stator pocket, the walls of said rotor pocket between said vanes being smooth and imperforate, said opening being spaced radially outwardly of the radially inner limit of said one stator pocket and the radially inner end of said opening lying in a plane substantially perpendicular to said offset wall portion whereby fluid flows generally radially inwardly along such wall portion, and means connected for supplying fluid to said fluid inlet opening independently of fluid circulating in the brake.

11. A brake according to claim 10 wherein said fluid inlet opening is elongated circumferentially and relatively narrow longitudinally of the axis of said rotor.

References Cited in the file of this patent

UNITED STATES PATENTS

| Number | Name | Date |
|---|---|---|
| 838,765 | Bissell | Dec. 18, 1906 |
| 1,024,982 | Föttinger | Apr. 30, 1912 |
| 2,170,128 | De La Mater | Aug. 27, 1939 |
| 2,250,885 | Batten | July 29, 1941 |
| 2,280,042 | Duffield | Apr. 14, 1942 |
| 2,336,838 | Bennett | Dec. 14, 1943 |
| 2,349,921 | Wemp | May 30, 1944 |
| 2,388,112 | Black et al. | Oct. 20, 1945 |
| 2,537,800 | Stoeckly | Jan. 9, 1951 |
| 2,570,768 | Clerk | Oct. 9, 1951 |
| 2,634,830 | Cline | Apr. 14, 1953 |
| 2,672,953 | Cline | Mar. 23, 1954 |
| 2,672,954 | Bennett | Mar. 23, 1954 |